United States Patent [19]

Suda et al.

[11] Patent Number: 5,182,443
[45] Date of Patent: Jan. 26, 1993

[54] OPTICAL APPARATUS HAVING VISUAL AXIS DETECTOR AND DETERMINING WHETHER EYEGLASSES ARE WORN

[75] Inventors: Yasuo Suda, Yokohama; Akihiko Nagano, Kawasaki; Kazuki Konishi, Tokyo, all of Japan

[73] Assignee: Canon Kabushiki Kaisha, Tokyo, Japan

[21] Appl. No.: 767,665

[22] Filed: Sep. 30, 1991

[30] Foreign Application Priority Data

Sep. 29, 1990 [JP] Japan .................................. 2-260840
Sep. 29, 1990 [JP] Japan .................................. 2-260841

[51] Int. Cl.$^5$ ..................... G03B 13/02; G03B 29/00; G01V 9/04
[52] U.S. Cl. ................................ 250/201.2; 250/221; 250/561; 354/62; 354/400; 354/219
[58] Field of Search ................ 250/221, 561, 201.2, 250/201.4, 201.6, 201.7, 201.8; 354/400, 62, 402, 219; 351/210

[56] References Cited

U.S. PATENT DOCUMENTS

| | | | |
|---|---|---|---|
| 3,804,496 | 4/1974 | Crane et al. | 250/221 |
| 4,075,657 | 2/1978 | Weinblatt | 358/125 |
| 4,287,410 | 9/1981 | Crane et al. | 250/201.4 |
| 4,574,314 | 3/1986 | Weinblatt | 358/227 |
| 4,755,045 | 7/1988 | Borgh et al. | 351/210 |
| 4,812,033 | 3/1989 | Ishikawa | 354/62 |
| 4,828,381 | 5/1989 | Shindo | 354/62 |
| 5,036,347 | 7/1991 | Tsunekawa et al. | 354/62 |

FOREIGN PATENT DOCUMENTS

| | | | |
|---|---|---|---|
| 61-172552 | 8/1986 | Japan . | |
| 2-065834 | 3/1990 | Japan . | |
| 2-065835 | 3/1990 | Japan . | |
| 2-065836 | 3/1990 | Japan . | |
| 2-213322 | 8/1990 | Japan . | |
| 0023431 | 1/1991 | Japan | 354/62 |

*Primary Examiner*—David C. Nelms
*Assistant Examiner*—Michael Messinger
*Attorney, Agent, or Firm*—Fitzpatrick, Cella, Harper & Scinto

[57] ABSTRACT

An optical apparatus includes a view finder through which a subject is observed, a visual axis detection device for detecting a direction of a visual axis of an observer who is looking into the view finder, and a determination device for determining whether or not the observer is wearing eyeglasses.

15 Claims, 8 Drawing Sheets

F I G. 2
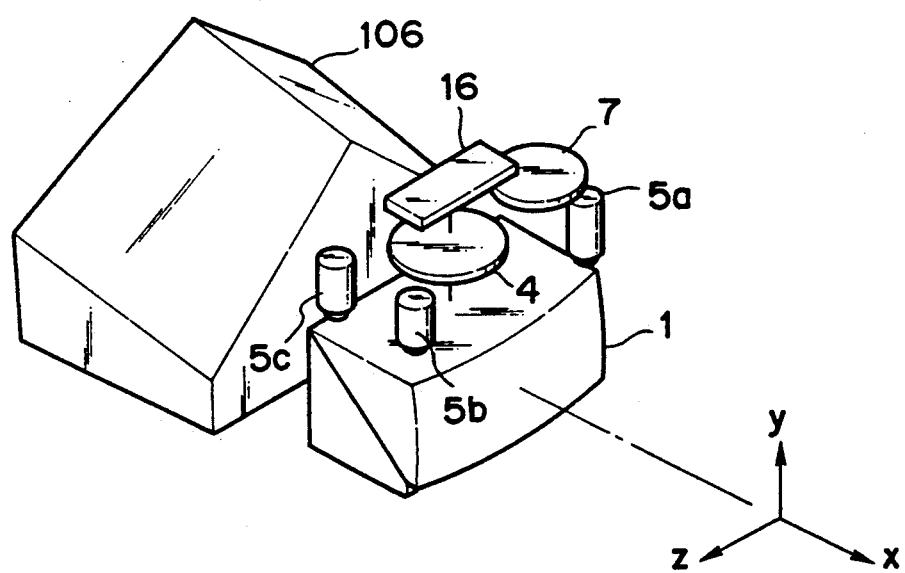

OPTICAL APPARATUS HAVING VISUAL AXIS DETECTOR AND DETERMINING WHETHER EYEGLASSES ARE WORN

BACKGROUND OF THE INVENTION

1. Field of the Invention

The present invention relates to an optical apparatus having a visual axis detection means, and more particularly, to an optical apparatus, such as a camera, having a visual axis detection means designed to detect an axis of a focal point at which an observer (a photographer) is observing, i.e., a visual axis (visual line), on an observing surface (a focusing surface) on which an image of a subject is formed by a photographing system by utilizing an image reflected by an eyeball which is obtained by illuminating the surface of the eyeball of the observer.

2. Related Background Art

A variety of visual axis (visual line) detecting devices for detecting the point at which an observer is observing, i.e., a visual axis (visual line), on an observing surface have been proposed.

In the visual axis detecting device disclosed in, for example, Japanese Patent Laid-Open No. 61-172552, parallel rays of light from a light source are projected on the front portion of an eyeball of the observer, and the visual line is obtained by utilizing an image reflected by a cornea, which is formed by the light reflected by the cornea, as well as the position at which the pupil is formed. FIG. 8A is a schematic view of a visual axis detecting optical system, and FIG. 8B shows distribution of the level of a signal output from a photoelectric element array 6.

In the visual axis detection system shown in FIG. 8A, a light source 5, such as a light-emitting diode, for emitting an infrared radiation invisible to an observer is disposed on the focal plane of a projection lens 3.

The infrared radiation emitted from the light source 5 passes through the projection lens 3 which creates a beam made up of parallel rays of light. The radiation is reflected by a half mirror 2, and then it irradiates a cornea 21 of an eyeball 201. An image d reflected by the cornea 21, which is formed by part of the infrared radiation reflected by the surface of the cornea 21, passes through the half mirror 2 and is directed to a position $Zd'$ on the photoelectric element array 6 by a light-receiving lens 4 to form an image thereon.

Rays of light from end portions a and b of an iris 23 pass through the half mirror 2 then the light-receiving lens 4 and form images of the end portions a and b at positions $Za'$ and $Zb'$ on the photoelectric element array 6. When a rotational angle $\theta$ of an optical axis N of the eyeball is small with respect to the optical axis M of the light-receiving lens 4, the Z coordinate $Zc$ of the central position c of a pupil 24 is expressed as $$Zc \simeq (Za+Zb)/2$$

where $Za$ and $Zb$ are respectively Z coordinates of the end portions a and b of the iris 23.

The rotational angle $\theta$ of the optical axis N of the eyeball substantially satisfies the relation expressed by the following equation $$\overline{OC} \cdot SIN\ \theta \simeq Zc - Zd \tag{1}$$

where $Zd$ is the Z coordinate of the position d at which the image reflected by the cornea is generated and $\overline{OC}$ is the distance between the center of curvature O of the cornea 21 and the center C of the pupil 24. Hence, an operation means 9 can obtain the rotational angle $\theta$ of the optical axis N of the eyeball 201 by detecting the positions of the characteristic points projected on the photoelectric element array 6 (the image d reflected by the cornea and the end portions a and b of the iris), as shown in FIG. 8B. At that time, equation (1) is transformed into $$\beta \cdot \overline{OC} \cdot SIN\ \theta \simeq \frac{Za' - Zb'}{2} - Zd' \tag{2}$$

where $\beta$ is the magnification determined by a distance L1 between the position d at which the image reflected by the cornea is generated and the light-receiving lens 4 and a distance L0 between the light-receiving lens 4 and the photoelectric element array 6, which magnification is, in general, substantially constant.

The optical axis N of the eyeball of the observer does not coincide with the visual axis. Ser. No. 671,656 discloses the structure for detecting the visual axis corrected by the angle between the optical axis of the eyeball of the observer and the visual axis. In this structure, after the rotational angle $\theta$ of the optical axis of the eyeball of the observer in the horizontal direction is calculated, it is corrected by the angle $\delta$ between the optical axis of the eyeball and the visual axis, and the visual axis $\theta H$ of the observer in the horizontal direction is expressed as $$\theta H = \theta \pm \delta \tag{3}$$

In the above equation, assuming that the rightward rotation with respect to the observer is positive, if the observer looks into the observing device with his or her left eye, the sign + is used. If the observer looks with his or her right eye, the sign − is selected.

In the example shown in FIG. 8A, the eyeball of the observer is rotated on a Z-X plane (e.g., on the horizontal plane). However, rotation of the eyeball of the observer on the X-Y plane (e.g., on the vertical plane) can also be detected in a similar manner. In this case, since the vertical component of the visual axis of the observer coincides with the vertical component $\theta'$ of the optical axis of the eyeball, the visual axis $\theta V$ in the vertical direction is expressed as $$\theta V = \theta' \tag{4}$$

FIG. 9 shows the layout of an optical system in which the visual axis detection device shown in FIG. 8A is applied to part of the finder system of a single-lens reflex camera.

In the structure shown in FIG. 9, a light from a subject passes through a photographic lens 101 and is reflected by a quick return mirror 102. The reflected light forms an image in the vicinity of the focal plane of a focusing screen 104. The light from the subject diffused by the focusing screen 104 passes through a condenser lens 105, a pentagonal roof prism 106 and then an eyepiece lens 1 having a light dividing surface 1a, and is directed to an eye point 201a of a photographer.

A visual axis detection optical system includes an illumination means (having an optical axis S) having the light source 5, such as a light-emitting diode, for emitting infrared radiation invisible to the eyes of the photographer (observer), and the projection lens 3, and a light-receiving means (having an optical axis t) having the photoelectric element array 6, the half mirror 2 and the light-receiving lens 4. The visual axis detection optical system is disposed above the eye-piece lens 1 having the light dividing surface 1a, which comprises a dichroic mirror. The infrared radiation emitted from the infrared radiation emitting diode 5 is reflected by the light dividing surface 1a and then irradiates the eyeball 201 of the photographer. Part of the infrared radiation reflected by the eyeball 201 is reflected by the light-dividing surface 1a again, passes through the light-receiving lens 4 and the half mirror 2 and enters the photoelectric element array 6. From the image data for the eyeball obtained on the photoelectric element array 6 (for example, an output signal shown in FIG. 7B), the operation means 9 calculates the direction of the visual axis of the photographer, that is, the operation means 9 obtains the point (focal point) on the focusing screen 104 at which the observer is looking.

From the horizontal visual axis $\theta H$ and the vertical axis $\theta V$, the point $(Zn, Yn)$ on the focusing screen 104 at which the photographer is looking is expressed by $$Zn = m * \theta H$$

$$Yn = m * \theta V \tag{5}$$

where m is the constant determined by the finder system of a camera.

In a single-lens reflex cameras with an auto focus detecting device having a plurality of focus detectable points on the screen including the central point thereof which can be selected by the photographer as a point at which auto focusing is detected, when the point on the focusing screen 104 at which the photographer is observing is determined, the operation of selecting one of the plurality of points at which focusing is automatically detected is be omitted. The determined point is regarded as the point at which focusing is to be detected, and automatic focus detection is conducted at that selected point.

Cameras are operated by photographers who wear glasses or who do not wear glasses. In general, the eye point of the photographer who does not wear eye glasses is separated from that of the photographer who do not wear eye glasses by several millimeters.

In the visual axis detecting method shown in FIG. 8, the eyeball of the observer who is located at a predetermined position is illuminated, the light reflected by the eyeball is received by the photoelectric element array, and the visual axis is detected on the basis of the obtained eyeball image. Hence, when the eye point of the observer is separated greatly from the predetermined position, the detected eyeball image deteriorates, thus reducing the detection accuracy of the visual axis.

In order to overcome this problem, the present applicants filed Patent Application No. hei 1-247332 which discloses the camera having the visual axis detection device capable of detecting the visual axis with a high degree of accuracy by controlling the visual axis detection method using data representing whether or not the photographer wears the eye glasses which is input by means of a switch provided on part of the camera. U.S. Pat. No. 4,575,314 discloses the television camera having the visual axis detecting device.

SUMMARY OF THE INVENTION

An object of the present invention is to provide an optical apparatus having a visual axis detecting device capable of eliminating the operation of inputting into the optical apparatus data representing whether or not an observer is wearing eyeglasses and of detecting a visual axis of the observer with a high degree of accuracy regardless of whether the observer is wearing glasses or not.

Another object of the present invention is to provide a camera having a visual axis detecting device for detecting a visual axis of an eyeball of a photographer who is looking into a finder system of the camera by detecting the rotational axis of an optical axis of the photographer's eyeball. An eye glass detection means is provided in part of the camera to make a determination whether or not the photographer is wearing the eyeglasses.

Still another object of the present invention is to provide a camera which comprises an illumination means for illumination an eyeball of a photographer who is looking into a finder system of the camera, a light-receiving means for detecting the points on a predetermined surface at which an image reflected by a cornea of the eyeball and an image reflected by an iris are formed, and an operation means for detecting a visual axis of the eyeball by utilizing the output signal from the light-receiving means. The light-receiving means has a two-dimensional image sensor, and it is determined whether or not the photographer is wearing the eye glasses by detecting by an eye glass detection means whether or not the image reflected by the eye glass is formed on a line separated from the line on which the image reflected by the cornea is formed on the surface of the image sensor. The image receiving state of the light-receiving means is adjustable.

BRIEF DESCRIPTION OF THE DRAWINGS

FIG. 2 is a schematic view of the essential parts of a visual axis detection means of FIG. 1A;

DESCRIPTION OF THE PREFERRED EMBODIMENT

Figure 1A:
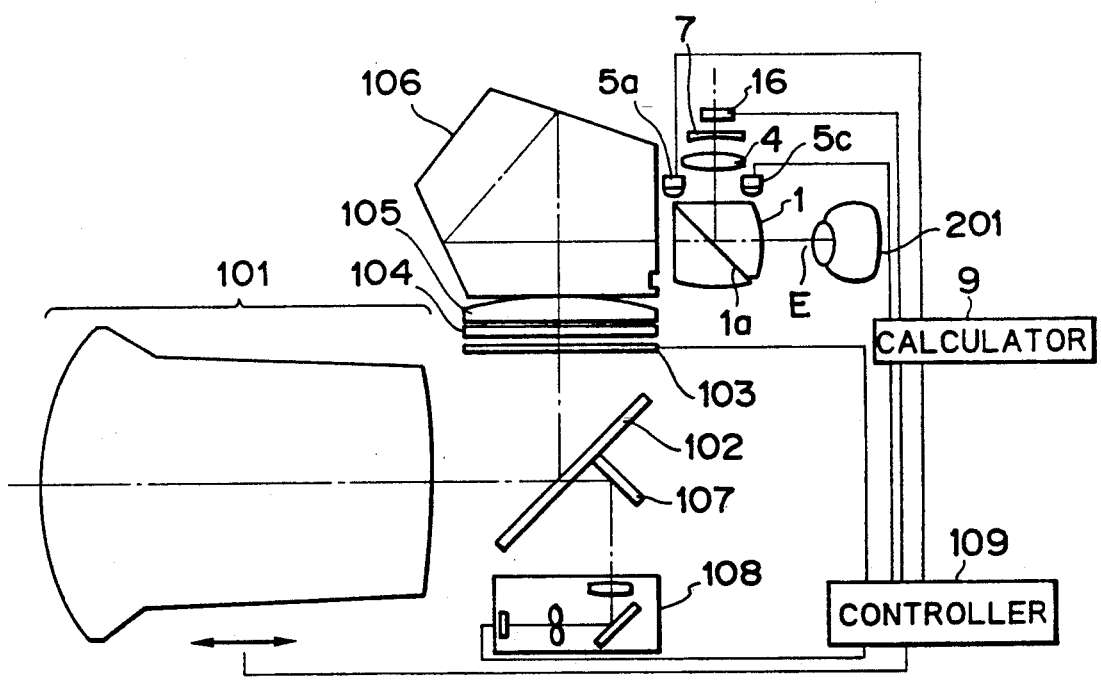
FIG. 1A is a schematic view of the essential parts of an optical system according to the present invention which is applied to a single-lens reflex camera.
Figure 1B:
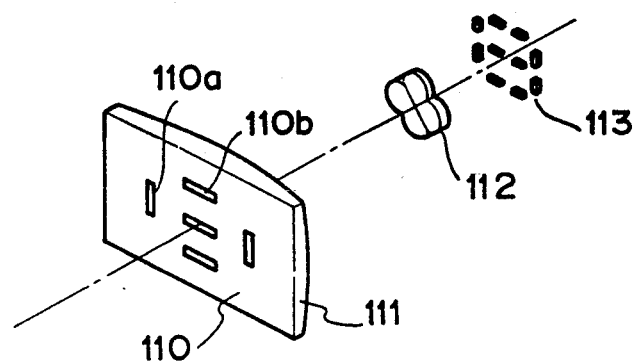
FIG. 1B illustrates part of the optical system of FIG. 1A.

FIG. 1A shows a first embodiment of an optical system according to the present invention which is applied to a single-lens reflex camera, and FIG. 1B shows part of the optical system of FIG. 1A.

An eye-piece lens 1 has in it a dichroic mirror 1a which passes visible light but reflects infrared radiation, and thus also acts as an optical path divider.

A light-receiving lens 4 and an image sensor 16 in combination form a light-receiving means. An illumination means 5 is made up of, for example, a plurality of light-emitting diodes 5a, 5b and 5c for emitting a diffused light to illuminate an eye.

The image sensor 16 comprises a two-dimensional photoelectric element array. The image sensor 16 is disposed in a conjugate relation with the vicinity of the pupil of an eye located at a predetermined position (at a position of the eye point of a photographer who does not wear eye glasses) with respect to the light-receiving lens 4 and the eye-piece lens 1.

An auxiliary lens 7 is disposed in such a manner that it can be inserted in and retracted from the optical path. The auxiliary lens 7 is retracted from the optical path when it is determined by a visual axis processing unit, which will be described later, that the photographer is not wearing eye glasses. With the depth of field of the optical system taken into consideration, the refractive power of the auxiliary lens 7 is set to a value which matches the refractive power of the ordinary eye glasses.

The visual axis processing device 9 has the functions of correcting a visual axis, of storing the visual axis correcting data, of detecting eye glasses, of operation a visual axis, and of controlling the infrared radiation emitting diodes 5a, 5b and 5c. The components 1, 4, 5 and 16 in combination form the visual axis detection means. The components, 1, 4, 5, 16 and 9 in combination form the eye glass detection means.

The optical system also includes a photographic lens 101, a quick return (QR) mirror 102, a display device 103, a focusing screen 104, a condenser lens 105, a pentagonal roof prism 106, a submirror 107, and a multiple focusing detecting device 108 for detecting focusing at an area within a photographing screen which is selected from a plurality of areas.

Description of the multiple focusing detection device is not necessary for understanding the present invention and hence outlined below.

As shown in FIG. 1B, the multiple focusing detecting device is disposed close to the photographic lens 101. The multiple focusing detecting device includes a field mask 110 having a plurality of slits 110a and 110b for determining the distances to be measured, a lens member 111 which acts as a field lens for each of the images formed within the slits, the lens member 111 being disposed adjacent to the field mask 110, an image forming lens block 112 having lens pairs in a number corresponding to the number of slits, and a photoelectric element array block 113. The field mask 110, the field lens 111, the image forming lens block 112 and the photoelectric element array block 113 in combination form a known focus detection system.

A camera control device 109 has the function of driving the display device provided within the finder, of operating focusing, and of driving lenses.

In this embodiment, part of the light from a subject passes through the photographic lens 101 and is then reflected by the QR mirror 102. The reflected light forms an image of the subject near the focusing screen 104. The light from the subject diffused by the diffusing surface of the focusing screen 104 passes through the condenser lens 105, the pentagonal roof prism 106, and then the eye-piece lens 1 and reaches an eye point E.

The display device 103 may be a two-layer guest-host liquid crystal display device which does not employ a polarizing plate. The display device 103 displays the distance measuring area (the focus detection position) within the finder.

Part of the light from the subject which passes through the photographic lens 101 passes through the QR mirror 102 and is reflected by the submirror 107. The reflected light is directed to the multiple focusing detection device 108 disposed at the bottom of the camera body. The photographic lens 101 is moved out (or moved in) by a photographic lens drive device which is not shown for focusing on the basis of the focusing detection data at the position on the surface of the subject which is selected by the multiple focusing detecting device 108.

The visual axis detecting device includes the visual axis detection means having the components 1, 4, 5 and 16 and the visual axis processing device 9 for calculating the visual axis.

In the visual axis detection means, the infrared radiation emitted from the infrared radiation emitting diodes 5a, 5b and 5c enters the eye-piece lens 1 from above, as viewed in FIG. 1A and is reflected by the dichroic mirror 1a. The reflected infrared radiation irradiates the eyeball 201 of the observer located close to the eye point E. The infrared radiation reflected by the eyeball 201 is reflected by the dichroic mirror 1a and is converged by the light-receiving lens 4. The converged light forms an image on the image sensor 16. The visual axis processing device 9 is implemented by the software of a microcomputer.

The focusing point data detected by the visual axis processing device 9 is transmitted to the display device 103 and the multiple focusing detecting device 108 through the camera control device 109. The display device 103 displays the spot at which the observer is looking within the finder of the camera and thereby confirms the focusing point (the focusing detecting point).

The multiple focus detecting device 108 detects focusing at the point on the subject at which the observer is looking, and performs focusing with respect to the observed subject.

FIG. 2 is a perspective view of the essential parts of the visual axis detection means of FIG. 1. Infrared radiation emitting diodes 5a, 5b and 5c are used in a pair to detect the distance between the camera and the eyeball of the observer. The diode pair used is determined by the posture of a camera: the infrared radiation emitting diodes 5a and 5b are used to detect the position in the horizontal direction. The position in the vertical direction is detected by using the infrared radiation emitting diodes 5b and 5c. The posture of the camera may be detected by a camera posture detection means (not shown) which may comprise a mercury switch.

Figure 3A:
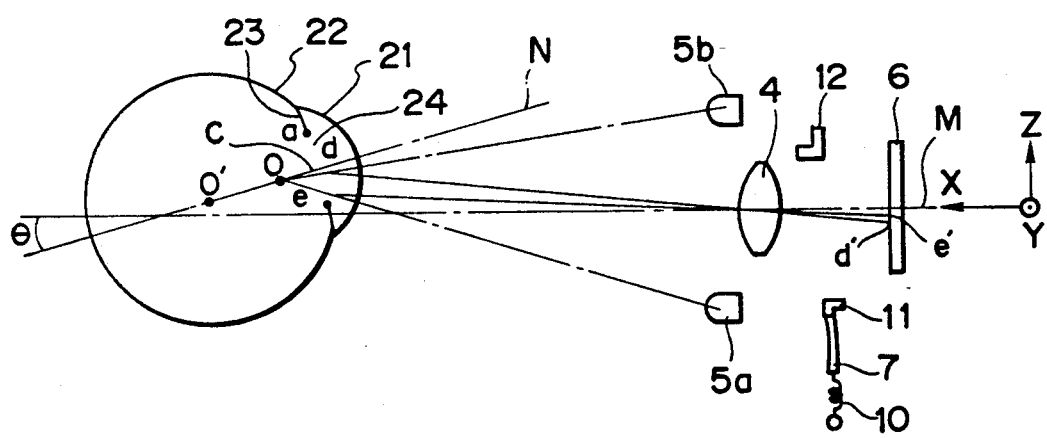
FIG. 3A illustrates the principle of the visual axis detection method according to the present invention.
Figure 3B:
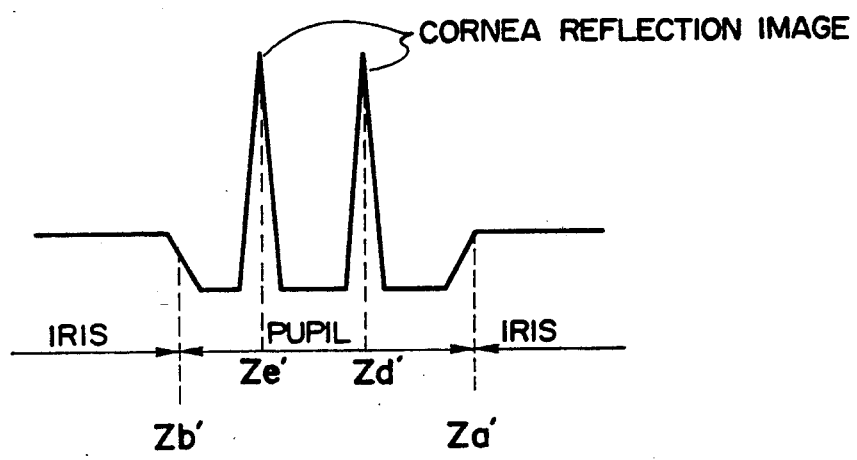
FIG. 3B illustrates distribution of the level of a signal output from an image sensor.

FIG. 3A illustrates the principle of the visual axis detecting means according to the present invention, and FIG. 3B shows distribution of the level of a signal output from the image sensor 16 of FIG. 3A.

The infrared radiation emitting diodes 5a, 5b and 5c are disposed substantially in a symmetrical fashion in the Z direction to illuminate the eyeball of the photographer.

The auxiliary lens 7 shown in FIG. 3A is retracted from the optical path by a spring 10. A claw 11 is mounted on a lens frame (not shown) to hold the auxiliary lens 7. A claw 12 is mounted on a lens barrel (not shown) for holding the light-receiving lens 4 so that it makes a pair with the claw 11 when the auxiliary lens 7 is disposed in the optical path.

The infrared radiation emitted from the infrared radiation emitting diode 5b illuminates the cornea 21 of the eyeball. An image d reflected by the cornea, formed by part of the infrared radiation reflected by the surface of the cornea 21, is directed by the light-receiving lens 4 to the image sensor 16 to form an image again at a position d' on the image sensor 16.

Similarly, the infrared radiation emitted from the infrared radiation emitting diode 5a illuminates the cornea 21 of the eyeball. An image e reflected by the cornea, formed by part of the infrared radiation reflected by the surface 21 of the cornea 21, is directed by the light-receiving lens 4 to a position e' on the image sensor 16.

Rays of light from the end portions a and b of the iris 23 pass through the light-receiving lens 4 and form images of the end portions a and b at positions a' and b' on the image sensor 16. When the rotational angle $\theta$ of the optical axis N of the eyeball with respect to the optical axis (optical axis M) of the light-receiving lens 4 is small, the coordinate Zc of the central position c of the pupil 24 is expressed as $$Zc \simeq (Za+Zb)/2$$

where Za and Zb are respectively Z coordinates of the end portions a and b of the iris 23.

Since the Z coordinate of the midpoint between the images d and e reflected by the cornea coincides with the Z coordinate Zo of the center of curvature O of the cornea 21, the rotational angle $\theta$ of the optical axis N of the eyeball substantially satisfies the relation expressed by the following equation $$(A1 * \overline{OC}) * \text{SIN } \theta \simeq Zc - (Zd+Ze)/2 \quad (6)$$

where Zd and Ze are the Z coordinates of the positions d and e at which the images reflected by the cornea are generated, $\overline{OC}$ is the standard distance between the center of curvature O of the cornea 21 and the center C of the pupil 24, and A1 is the coefficient which expresses the differences of the distance $\overline{OC}$ among individuals. Hence, an operation means 9 can obtain the rotational angle $\theta$ of the optical axis N of the eyeball 201 by detecting the positions of the characteristic points (the images d and e reflected by the cornea and the end portions a and b of the iris) projected on part of the image sensor 16, as shown in FIG. 3B. At that time, equation (6) is transformed into $$\beta * (A1 * \overline{OC}) \times \text{SIN } \theta \simeq \frac{Za' + Zb'}{2} - \frac{Zd' + Ze'}{2} \quad (7)$$

where $\beta$ is the magnification determined by the position of the eyeball with respect to the light-receiving lens 4. Substantially, $\beta$ is the function of the distance $|Zd' - Ze'|$ of the image reflected by the cornea.

The rotational angle $\theta$ of the eyeball is given by $$\theta \simeq \text{ARCSIN } \{(Zc' - Zf')/\beta/(A1 * \overline{OC})\} \quad (8)$$

where $Zc' \simeq (Za' + Zb')/2$ and $Zf' \simeq (Zd' + Ze')/2$.

Since the optical axis of the eyeball of the photographer does not coincide with the visual axis thereof, the rotational angle $\theta$ of the optical axis of the photographer's eyeball in the horizontal direction is corrected by the angle $\delta$ between the optical axis of the eyeball and the visual axis to obtain the visual axis $\theta$ H of the observer in the horizontal direction. The visual axis $\theta$ H of the observer in the horizontal direction is expressed as $$\theta H = \theta \pm (B1 * \delta) \quad (9)$$

where B1 is the coefficient which expresses the differences of the angle $\delta$ between the optical axis of the eyeball and the visual axis thereof among individuals. In the above equation, assuming that the rightward rotation with respect to the photographer is positive, if the observer looks into the observing device with his or her left eye, the sign + is used. If the observer looks with his or her right eye, the sign − is selected.

In the example shown in FIG. 3A, the eyeball of the photographer is rotated on a Z-X plane (e.g., on the horizontal plane). Rotation of the eyeball of the observer on the X-Y plane (e.g., on the vertical plane) can be detected in a similar manner. In this case, since the vertical component of the visual axis of the photographer coincides with the vertical component $\theta'$ of the optical axis of the eyeball, the visual axis $\theta$ V in the vertical direction is expressed as $$\theta V = \theta'$$

From the visual axis data $\theta$ H and $\theta$ V, the position (Zn, Yn) on the focusing screen at which the photographer is looking is given by $$\begin{aligned} Zn &\simeq m * \theta H \\ &\simeq m * [\text{ARCSIN } \{(Zc' - Zf')/\beta/(A1 * OC)\} \pm \\ &\quad (B1 * \delta)] \\ Yn &\simeq m * \theta V \end{aligned} \quad (10)$$

where m is the constant determined by the finder optical system of a camera.

The coefficients A1 and B1 used for correcting the differences of the photographers eyeballs are obtained by making the photographer look at the mark provided at a predetermined position in the finder of a camera and then by making the position of the mark coincide with the position of the looked point calculated by equation (10).

The principle of determining whether or not the photographer is wearing eyeglasses will be described below.

Figure 4A:
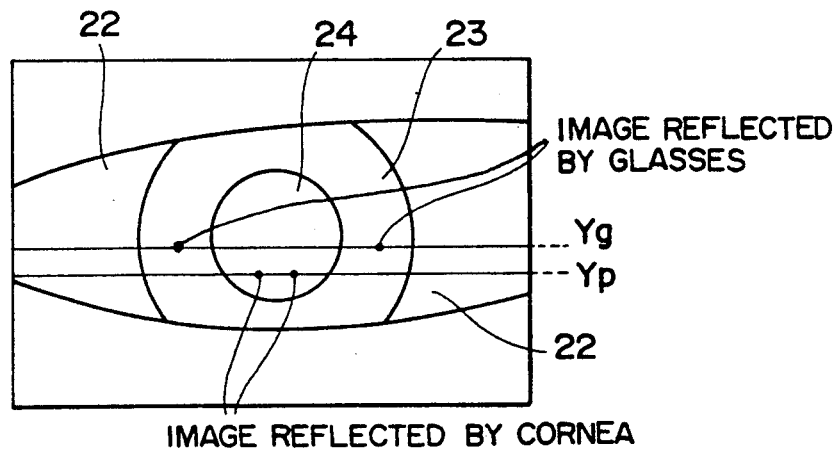
FIG. 4A illustrates image reflected by a glass and a cornea on the image sensor.
Figure 4B:
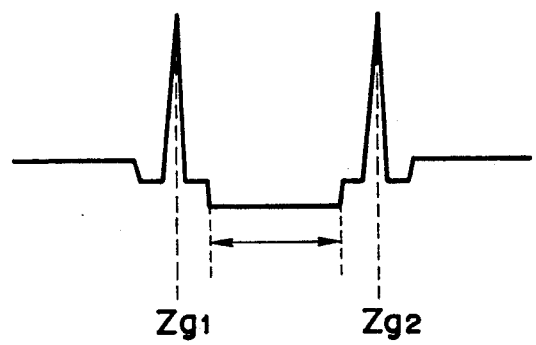
FIG. 4B illustrates distribution of the level of signal output from the image sensor.
Figure 6:
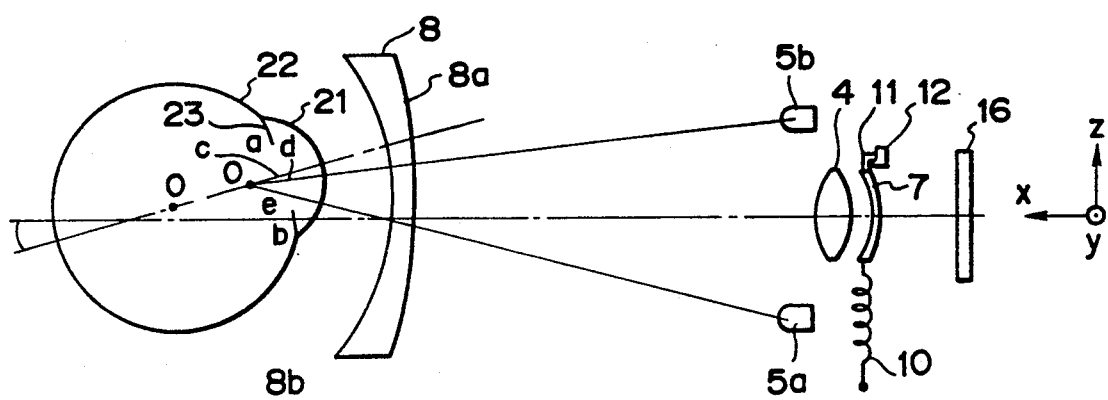
FIG. 6 shows a visual axis detecting optical system according to the present invention when an observer is wearing eyeglasses.
Figure 5:
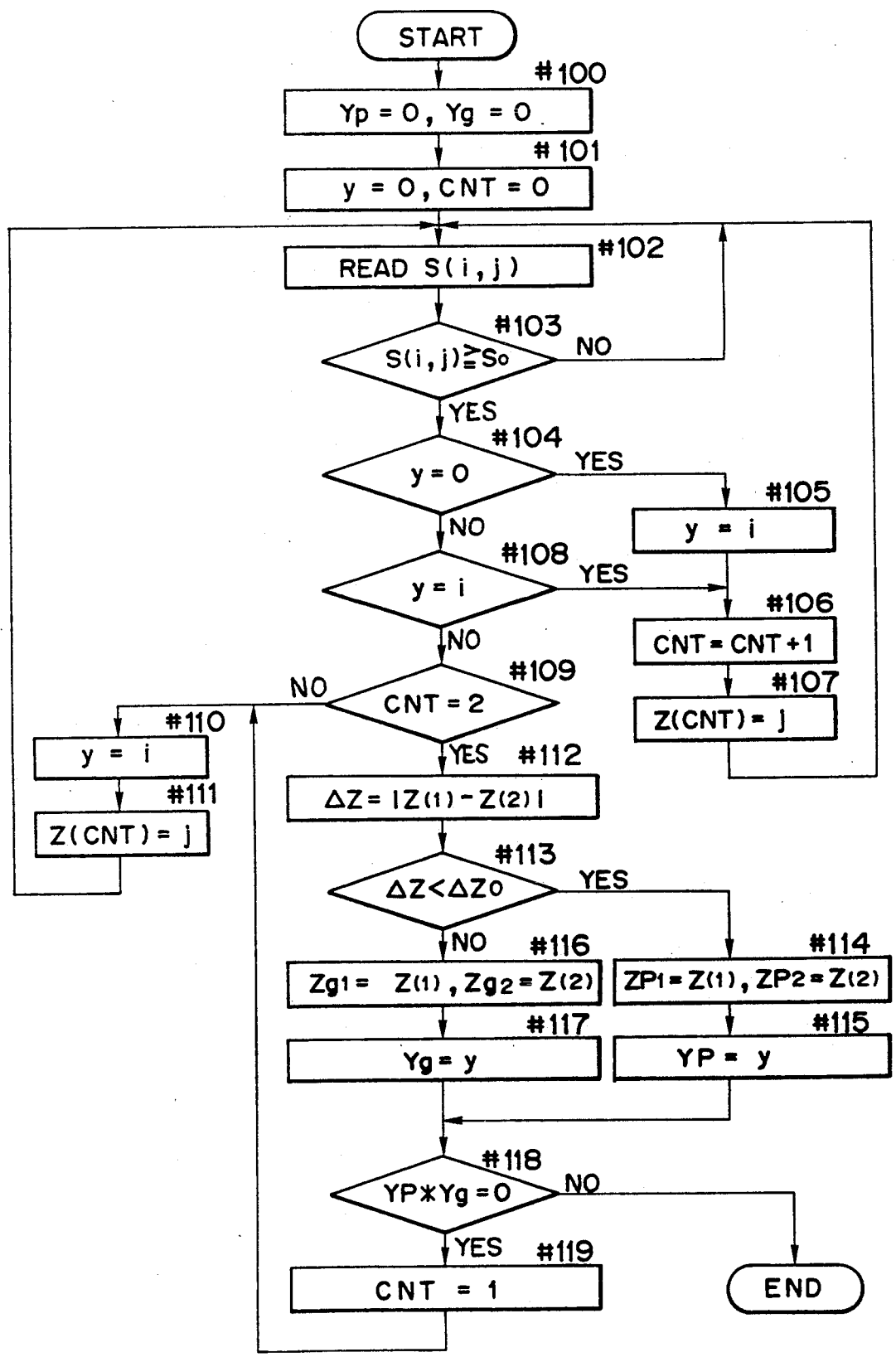
FIG. 5 is a flowchart showing the eyeglass detection operation according to the present invention.

FIG. 4A schematically shows the eyeball image of the photographer who is wearing eyeglasses which is projected on the image sensor 16, FIG. 4B shows distribution of the level of a signal on a single line Yg of the image sensor 16, FIG. 5 is a flowchart of the operation for determining whether or not the photographer is wearing eyeglasses, and FIG. 6 shows a visual axis detecting optical system when it is determined that the photographer is wearing eyeglasses. In FIG. 6, reference numeral 8 denotes an eyeglass for shortsightedness.

If the photographer is wearing eyeglasses, as shown in FIG. 6, part of the illumination from the infrared radiation emitting diodes 5a and 5b is reflected by a first surface 8a (the surface located on the outer side of the photographer's eyeball) of the eyeglass 8, and is then made incident on the image sensor 16 through the light-receiving lens 4. The eyeball image produced on the image sensor 16 at that time is illustrated in FIG. 4A.

In FIG. 4A, the image formed by the light reflected by the first surface 8a of the eyeglass 8 is shown as the image reflected by the eyeglass. Since the two infrared radiation emitting diodes 5a and 5b are used, two images reflected by the eyeglass are in general formed on the same line.

Although images reflected by the eyeglass may also be formed by the light reflected by a second surface 8b of the eyeglass 8, they are omitted in this embodiment. As shown in FIG. 4B, the image reflected by the eyeglass is detected at a higher level than that at which the image reflected by the cornea is detected due to the higher reflectance of the eyeglass.

As shown in FIG. 4, the illuminating optical system of the visual axis detecting device of this embodiment is disposed such that it illuminates the photographer's eyeball from below. The eyeglass 8 is located in the X axis direction closer to the visual axis detecting device than the cornea 21 of the photographer. These make the images reflected by the eyeglass formed on a line (line Yg) different from that on which the images reflected by the cornea are formed.

Also, since the radius of curvature of the first surface 8a of the eyeglass 8 is in general larger than that of the cornea 21, the interval between the two images reflected by the eyeglass is larger than that between the two images reflected by the cornea. Consequently, it is possible to discriminate the images reflected by the eyeglass by detecting the interval between the reflected images having a higher level. This makes determination whether or not the photographer is wearing eyeglasses possible.

The operation of the visual axis processing device 9 will be described below with reference to FIG. 5. When detection of the visual axis is initiated, both the line Yp at which the images reflected by the cornea are generated and the line Yg at which the images reflected by the eyeglass are generated are first reset to zero (#100). Next, the line data parameter y and the counting parameter CNT are reset to zero (#101).

The parameter y takes a value of the line number at which the images reflected by the eyeglass or cornea are determined to be generated. The counting parameter is a number of images reflected by the eyeglass or cornea generated on the same line. Thereafter, the signal S(i, j) of the eyeball image stored in part of the memory of the visual axis processing device 9 beforehand is read out line sequentially. In this case, i and j are positive integers.

Since both the images reflected by the eyeglass or cornea are generated due to specular reflection, they have a high intensity. If the signal S(i, j) has the intensity smaller than the intensity So which is the threshold value of the intensity which enables discrimination of the image reflected by the eyeglass or cornea (#103), a subsequent signal S(i, j) is read out (#102). If the signal S(i, j) has an intensity larger than So (#103), the signal S(i, j) is regarded as the signal of the image reflected by the eyeglass or cornea, and determination as to whether the signal S(i, j) represents the image reflected by the eyeglass or cornea is then made. At that time, if the signal of the image reflected by the eyeglass or cornea is not detected by that time and hence the line data parameter y is zero (#104), i is set to the parameter y representing the line at which the image reflected by the eyeglass or cornea (#105).

Thereafter, 1 is added to the counting parameter CNT which represents the number of images reflected by the eyeglass or cornea on the line data parameter y (=i) (#106), and a position at which the image reflected by the eyeglass or cornea is generating is recorded as Z (CNT)=j (#107). Thereafter, a subsequent signal S(i, j) is read out (#102).

If the signal S(i, j) has an intensity larger than the intensity So (#103) and if the line data parameter y for that signal is not zero (#104), the the value of the parameter y is determined. If the line data parameter y coincides with the line number i at which the signal S(i, j) is read out (#108), 1 is added to the counting parameter CNT which represents the number of images reflected by the eyeglass or cornea (#106), and the position j at which the image reflected by the eyeglass or cornea is generating is recorded as Z(CNT)=j (#107). Thereafter, a subsequent signal S(i, j) is read out (#102).

If the line data parameter y does not coincide with the line number i at which the signal S(i, j) is read out (#108), it is determined that reading out of the signal S having the line data parameter y is completed, and the counting parameter CNT is determined (#109). If the counting parameter CNT is not 2 (if CNT=1), it is determined that there is only one signal S which is regarded as the image reflected by the eyeglass or cornea on the line data parameter y and that the already recorded position data Z (1) is hence not the image reflected by the eyeglass or cornea but a ghost or the like.

Thereafter, the line data parameter y is replaced by the line number i at which the signal S is currently read out (#110), and the position j at which the image reflected by the eyeglass or cornea is generating is recorded as Z (CNT)=j (#111). Thereafter, a subsequent signal S(i, j) is read out (#102).

If it is determined that the counting parameter CNT is 2 (#109), the interval ΔZ between the two positions at which the images reflected by the eyeglass or cornea are generating is obtained as ΔZ=|Z (1)−Z (2)| (#112).

Since the interval between the two images reflected by the eyeglass differs from that between the two images reflected by the cornea, if ΔZ is smaller than a threshold value ΔZo of the interval which discriminates the type of image (#113), it is determined that the image recorded positions Z (1) and Z (2) are for the images reflected by the cornea, and Zp1 and Zp2 are respectively set to Z (1) and Z (2) as the positions at which the images reflected by the cornea are formed (#114). Zp1 and Zp2 are equivalent to Ze' and Zd' shown in FIG. 3B. Thereafter, y is set to the line Yp at which the images reflected by the cornea are generating (#115).

If it is determined that the interval ΔZ is larger than the threshold value ΔZo (#113), it is determined that the image recorded positions Z (1) and Z (2) are for the images reflected by the eyeglass, and Zg1 and Zg2 are respectively set to Z (1) and Z (2) as the positions (#116). Thereafter, y is set to the line Yg at which the images reflected by the eyeglass are generating (#117).

Subsequently, it is determined whether or not both of the images reflected by the eyeglass and cornea are detected. If the product of Yg and Yp representing the lines at which the images are generating is zero, it is determined that either the images reflected by the eyeglass or those reflected by the cornea is not detected (#118). Hence, 1 is set to the counting parameter CNT (#119), and detection of the non-detected images continues (#110, #111, #102).

If the product of Yg and Yp representing the lines at which the images are generating is not zero, it is determined that both the images reflected by the eyeglass and cornea are detected (#118), and detection of the eyeglasses is completed.

Description of this flowchart has been made on the assumption that the photographer is wearing eyeglasses. If the photographer is not wearing eyeglasses, the value of the line Yg at which the images reflected by the eyeglass are generating is zero after all the image signals of the image sensor have been read out. Hence, the visual axis processing device 9 can determine that the photographer is not wearing eyeglasses.

In this flowchart, the number CNT of images reflected by the eyeglass or cornea which are generating on the same line is 2 at maximum. However, the number of images may be set to a value larger than 2 with generation of ghost or the like taken into consideration. In that case, discrimination between the images reflected by the eyeglass or cornea and ghost may be made by comparing the positions at which these images are generated.

When the signals S having an intensity larger than the intensity So are detected successively, it is desired to determine the position of the gravity of the successively detected signals S as the position of the image reflected by the eyeglass or cornea.

In this embodiment, the interval between the images is utilized to discriminate the image reflected by the eyeglass from the image reflected by the cornea. However, since the image reflected by the eyeglass has a higher intensity than the image reflected by the cornea, they may be discriminated using the absolute value of the intensity of the images.

FIG. 6 shows the visual axis detecting optical system when it is determined that the photographer is wearing eyeglasses. As shown in FIG. 6, the eye of the photographer who is wearing eyeglasses is separated from the eye of the photographer who is not wearing eyeglasses by several tens of millimeters away from the visual axis detecting device. Hence, when it is determined by the visual axis processing device that the photographer is wearing eyeglasses, the claw 11 mounted on the lens frame for holding the auxiliary lens 7 is pulled in the direction indicated by +Z, as viewed in FIG. 6, to set the auxiliary lens 7, comprising the concave lens, in the optical path.

Consequently, the eye of the photographer who is wearing eyeglasses and the image sensor 16 of the light-receiving optical system can be disposed in a conjugate relation, excellent image forming state can thus be achieved. While the auxiliary lens 7 is present in the optical path, the claw 11 is engaged with the claw 12 mounted on the lens barrel of the light-receiving lens 4.

If it is determined by the visual axis processing device 9 that the photographer is not wearing eyeglasses, the claw 11 is disengaged from the claw 12 and the auxiliary lens 7 is thereby retracted from the optical path, as shown in FIG. 3A.

In the example shown in FIG. 6, when it is determined that the photographer is wearing eyeglasses, the auxiliary lens 7 is set in the light-receiving optical system so as to establish the conjugate relationship between the eye of the photographer who is using the eyeglasses and the image sensor 16 of the light-receiving optical system. However, this objective may be achieved by moving the light-receiving lens 4 of the light-receiving optical system. In that case, a light-receiving lens 4 including a plurality of lenses may be moved as one unit or partially. Alternatively, the image sensor 16 may be moved.

Figure 7:
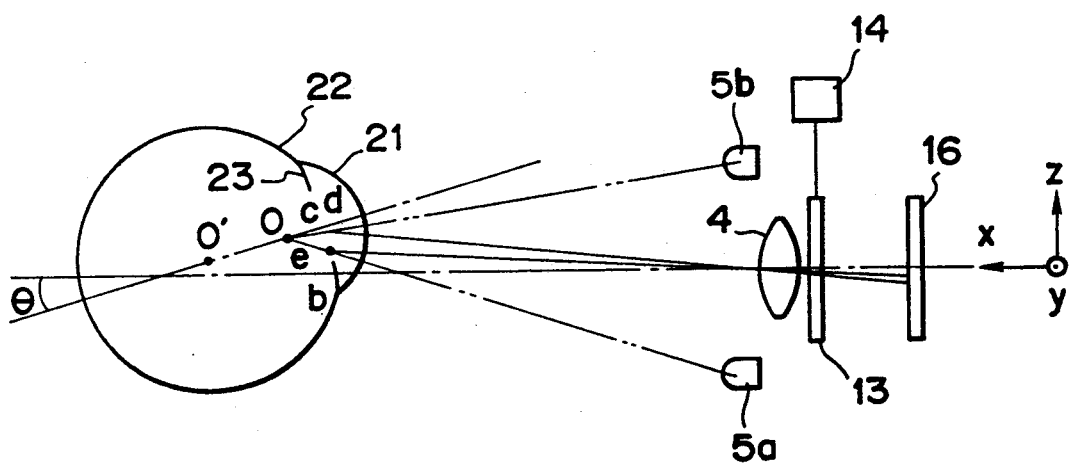
FIG. 7 shows a second embodiment of a visual axis detecting system according to the present invention.
Figure 8A:
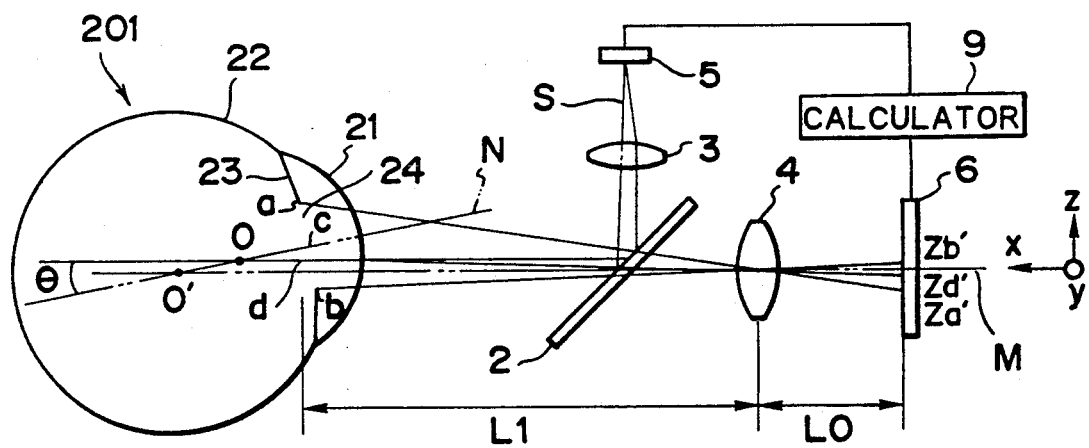
FIG. 8A illustrates the principle of detection by a conventional visual axis detecting optical system.
Figure 8B:
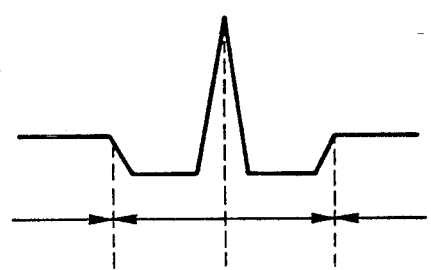
FIG. 8B illustrates distribution of the level of a signal from a photoelectric element array.
Figure 9:
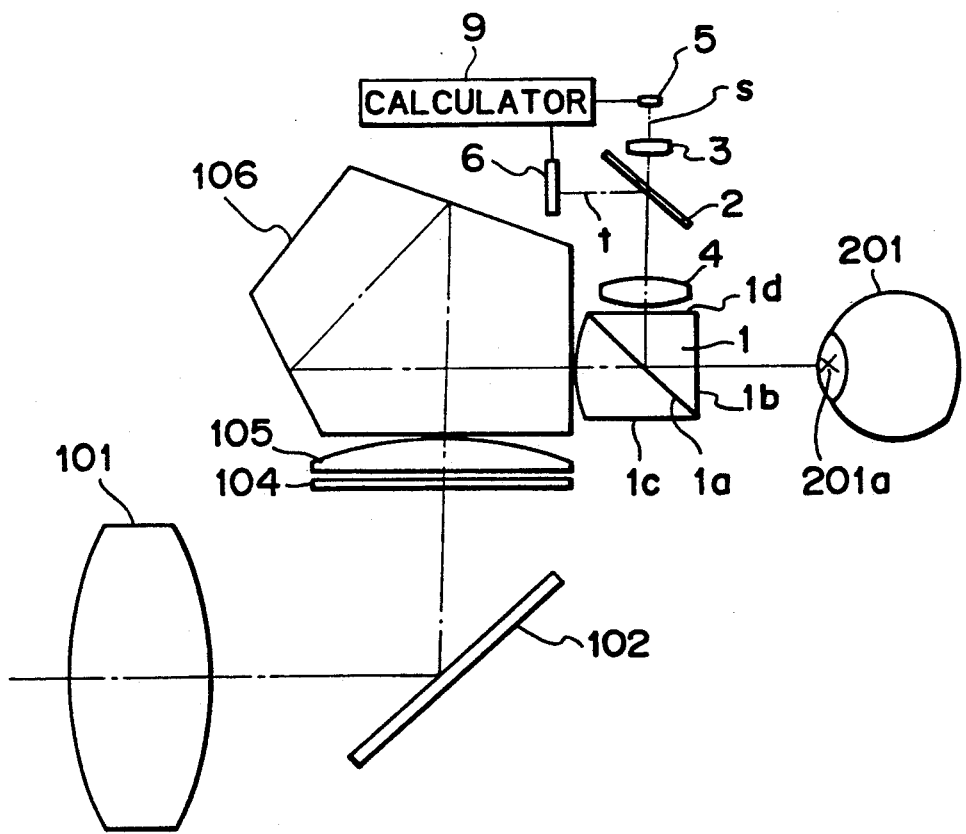
FIG. 9 is a schematic view of the essential parts of a camera having a conventional visual axis detection means.

FIG. 7 shows a second embodiment of a visual axis detecting optical system according to the present invention. In FIG. 7, the same reference numerals are used to denote parts which are the same as those shown in FIG. 3A. A diameter of an aperture 13 can be varied freely by a drive device 14. The light-receiving lens 4 of the visual axis detection means of this embodiment is designed for photographers who wear eyeglasses. It can direct the light reflected by the eyeball of such photographers to the image sensor 16 in an excellent state.

When detection of the photographers' visual axis is initiated by the signal from the camera body, the visual axis processing device (not shown) turns on the infrared radiation emitting diodes 5a and 5b and illuminates the eyeball of the photographer. As shown in FIG. 5, if it is determined by the eyeglass detection means of the visual axis processing device that the photographer is not wearing eyeglasses, a signal is sent from the visual axis processing device to the drive device 15 to reduce the diameter of the aperture 13. Consequently, the depth of field of the visual axis detecting optical system is increased, and the photographer's eyeball image located close to the visual axis detecting optical system can thus be detected excellently. Although reduction in the diameter of the aperture 13 in general reduces the intensity of light which reaches the image sensor 16, since the photographer's eyeball is located closer to the visual axis detecting optical system, loss of the illumination of the infrared radiation emitting diodes 5a and 5b is less, and a sufficient intensity of light for visual axis detection reaches the image sensor 16.

If it is determined by the eyeglass detection means of the visual axis processing device that the photographer is wearing eyeglasses, a signal is sent from the visual axis processing device to the drive device 14 to increase the diameter of the aperture 13. Consequently, the depth of field of the visual axis detecting optical system is reduced. However, since the light-receiving lens 4 of the visual axis detecting optical system is designed such that it directs the light reflected by the eyeball of the photographer to the image sensor 16 in an excellent state, the eyeball image does not deteriorate.

Since the eyeball of the photographer who is wearing eyeglasses is separated from the visual axis detecting optical system, loss of the light reflected by the eyeball is great. However, since the aperture 13 is opened, a sufficient intensity of light for visual axis detection reaches the image sensor 16.

As will be understood from the foregoing description, in the present invention, when the visual axis of the photographer is detected by detecting the rotational angle of the optical axis of the eyeball of the photographer who is looking into the finder of a camera, determination is made by the eyeglass detection means whether or not the photographer is wearing eyeglasses. Consequently, the visual axis of the photographer can be detected with a high degree of accuracy by the visual axis detection means without inputting data representing the use or non-use of the eyeglasses into the camera.

What is claimed is:

1. An optical apparatus comprising:
   a view finder through which a subject is observed;
   a visual axis detection means for detecting a direction of a visual axis of an observer who is looking into said view finder; and
   a determination means for determining whether or not the observer is wearing eyeglasses.

2. The optical apparatus according to claim 1, wherein said determination means performs the determination based on a data which is being processed by said visual axis detection means.

3. The optical apparatus according to claim 1, wherein said visual axis detection means includes an illuminator for illuminating an eye of the observer, a light-receiving optical member for converging a light reflected by the eye, and an image sensor for receiving the light from said light-receiving optical member, and wherein said determination means performs the determination on the basis of a signal output from said image sensor.

4. The optical apparatus according to claim 3, wherein said determination means determines the presence or absence of the eyeglasses on the basis of a signal from a line of said image sensor which is separated from a line from which a signal regarding the light reflected from a cornea of the eye is output.

5. The optical apparatus according to claim 3, wherein said illuminator includes a plurality of light sources.

6. The optical apparatus according to claim 5, wherein said illuminator irradiates diffused light.

7. The optical apparatus according to claim 3, wherein said light-receiving optical member is constructed such that it can change a focused state.

8. The optical apparatus according to claim 7, wherein said light-receiving optical member includes a fixed lens, and a movable lens which can move in a direction in which it intersects an optical path of said fixed lens.

9. The optical apparatus according to claim 8, wherein when said determination means determines the presence of the eyeglasses, the direction of the visual axis of the observer is detected in a state in which said movable lens is present in the optical path of said fixed lens.

10. The optical apparatus having a device for detecting a direction of a visual axis of an observer who is looking into a view finder, said apparatus comprising:
    a means of emitting rays of light toward an eye of the observer;
    a light-receiving means including a light-receiving optical system for receiving a light reflected by the observer, and a plurality of photo sensors for receiving the light from said light-receiving optical system; and
    a signal processing means for processing a signal output from said photo sensors to determine reflection from an eyeglass and for producing a signal representing that the observer is wearing the eyeglasses.

11. The optical apparatus according to claim 10, wherein said device for detecting the direction of the visual axis uses said light-receiving optical system to receive a light reflected by an eye of the observer.

12. The optical apparatus according to claim 11, wherein when said signal processing means outputs the signal representing that the observer is wearing the eyeglasses, said light-receiving means is put into an adjusted state different from that in which it is put when the visual axis of the observer who is not wearing the eyeglasses is detected.

13. The optical apparatus according to claim 12, wherein said light-receiving means further includes an auxiliary lens which is inserted into and retracted from an optical path of said light-receiving optical system when the adjusted state of said light-receiving means is changed.

14. The optical apparatus according to claim 12, wherein the adjusted state of said light-receiving means is changed by moving said light-receiving optical system along the optical path.

15. The optical apparatus according to claim 12, wherein said light-receiving means further includes an aperture whose diameter is changed when the adjusted state of said light-receiving means is changed.

* * * * *

UNITED STATES PATENT AND TRADEMARK OFFICE
CERTIFICATE OF CORRECTION

PATENT NO. : 5,182,443

DATED : January 26, 1993

INVENTOR(S) : Yasuo SUDA, et al.

It is certified that error appears in the above-identified patent and that said Letters Patent is hereby corrected as shown below:

COLUMN 2:

line 67, "axis S)" should read --axis s)--.

COLUMN 3:

line 17, "7B)," should read --8B),--;
    line 48, "do not" should read --does--; and
    line 67, "Pat. No. 4,575,314" should read
      --Patent No. 4,574,314".

COLUMN 4:

line 21, "illumination" should read
      --illuminating--; and
    line 51, "a glass" should read --glasses--.

COLUMN 5:

line 35, "of operation" should read --operation
      of--; and
    line 39, "components," should read --component--.

COLUMN 7:

line 62, "OC)" should read --$\overline{OC}$)--.

UNITED STATES PATENT AND TRADEMARK OFFICE
CERTIFICATE OF CORRECTION

PATENT NO. : 5,182,443

DATED : January 26, 1993

INVENTOR(S) : Yasuo SUDA, et al.

It is certified that error appears in the above-identified patent and that said Letters Patent is hereby corrected as shown below:

COLUMN 8:

line 50, "photographers" should read --photographer's--.

COLUMN 11:

line 6, "is" should read --are--.

Signed and Sealed this

Twenty-fifth Day of January, 1994

Attest:

BRUCE LEHMAN

Attesting Officer     Commissioner of Patents and Trademarks